United States Patent
Allam et al.

(10) Patent No.: US 9,919,268 B2
(45) Date of Patent: Mar. 20, 2018

(54) SYSTEMS AND METHODS FOR REMOVING COMBUSTION PRODUCTS FROM A POWER GENERATION CYCLE

(71) Applicant: 8 Rivers Capital, LLC, Durham, NC (US)

(72) Inventors: Rodney John Allam, Wiltshire (GB); Xijia Lu, Durham, NC (US); Scott Thomas Martin, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 15/298,975

(22) Filed: Oct. 20, 2016

(65) Prior Publication Data
US 2017/0113185 A1  Apr. 27, 2017

Related U.S. Application Data

(60) Provisional application No. 62/244,411, filed on Oct. 21, 2015.

(51) Int. Cl.
*B01D 53/60* (2006.01)
*B01D 53/64* (2006.01)
(Continued)

(52) U.S. Cl.
CPC ............ *B01D 53/78* (2013.01); *B01D 53/50* (2013.01); *B01D 53/56* (2013.01); *B01D 53/64* (2013.01);
(Continued)

(58) Field of Classification Search
CPC .. B01D 53/60; B01D 53/64; B01D 2251/102; B01D 2256/22; B01D 2257/302;
(Continued)

(56) References Cited

U.S. PATENT DOCUMENTS 8,025,860 B1 * 9/2011 Diamond ............. B01D 53/002
                                                422/168
8,580,206 B2 * 11/2013 Allam .................... B01D 53/60
                                                422/168
(Continued)

FOREIGN PATENT DOCUMENTS

JP      2016000381 A  *  1/2016  ............. Y02C 10/04

OTHER PUBLICATIONS

Murciano, et al. "Sour compression process for removal of Sox and NOx from oxyfuel-derived CO2," *Energy Procedia*, 2011, pp. 908-916, vol. 4 (2011).
(Continued)

*Primary Examiner* — Timothy C Vanoy
(74) *Attorney, Agent, or Firm* — Womble Bond Dickinson (US) LLP

(57) ABSTRACT

The present disclosure relates to a system for removing a pollutant from a power generation cycle that utilizes a high pressure circulating fluid. The system includes a first direct contact cooling tower configured to cool the high pressure circulating fluid and condense a fluid stream that removes $SO_2$ from the circulating fluid. A first recirculating pump fluidly communicates with the first direct contact cooling tower. The first tower includes an outlet configured to circulate a cooled $CO_2$ product stream, and a second direct contact cooling tower is configured to receive at least a portion of the cooled $CO_2$ product stream from the outlet. The second direct contact cooling tower is configured to cool the $CO_2$ product stream and condense a fluid stream that removes $NO_x$ from the $CO_2$ product stream. A second recirculating pump fluidly communicates with the second tower. An associated method is provided.

22 Claims, 4 Drawing Sheets

(51) Int. Cl.
    *F23J 15/04* (2006.01)
    *B01D 53/78* (2006.01)
    *B01D 53/50* (2006.01)
    *B01D 53/56* (2006.01)
    *F02C 3/34* (2006.01)
    *F01N 3/10* (2006.01)
    *F23J 15/06* (2006.01)
    *F23J 9/00* (2006.01)
    *F23C 9/00* (2006.01)
    *C01B 32/50* (2017.01)

(52) U.S. Cl.
    CPC ............... *C01B 32/50* (2017.08); *F01N 3/10* (2013.01); *F02C 3/34* (2013.01); *F23C 9/00* (2013.01); *F23J 15/04* (2013.01); *F23J 15/06* (2013.01); *B01D 2251/10* (2013.01); *B01D 2251/102* (2013.01); *B01D 2256/22* (2013.01); *B01D 2257/302* (2013.01); *B01D 2257/404* (2013.01); *B01D 2257/602* (2013.01); *B01D 2258/0283* (2013.01); *F01N 2570/04* (2013.01); *F01N 2570/14* (2013.01); *F23J 2215/20* (2013.01); *F23J 2215/50* (2013.01); *F23J 2219/40* (2013.01)

(58) Field of Classification Search
    CPC ........ B01D 2257/404; B01D 2257/602; B01D 2258/0283; B01D 53/78; B01D 53/50; B01D 53/56; F23J 15/04; F23J 15/06; F23J 2215/20; F23J 2215/50; F23J 2219/40; F23J 2215/10; F02C 3/34; F01N 3/10; F23C 9/00
    See application file for complete search history.

(56) References Cited

U.S. PATENT DOCUMENTS

| | | | |
|---|---|---|---|
| 8,596,075 B2 | 12/2013 | Allam et al. | |
| 9,067,165 B2* | 6/2015 | White | B01D 53/002 |
| 2007/0122328 A1* | 5/2007 | Allam | B01D 53/60 |
| | | | 423/235 |
| 2013/0206000 A1* | 8/2013 | Iijima et al. | B01D 53/1412 |
| | | | 95/19 |

OTHER PUBLICATIONS

White et at, "The Air Products Vattenfall Oxyfuel CO2 Compression and Purification Pilot Plant at Schwarze Pumpe," *Energy Procedia*, 2013, pp. 1490-1499, vol. 37.

\* cited by examiner

SYSTEMS AND METHODS FOR REMOVING COMBUSTION PRODUCTS FROM A POWER GENERATION CYCLE

CROSS-REFERENCE TO RELATED APPLICATIONS

The present application claims priority to U.S. Provisional Patent Application No. 62/244,411, filed Oct. 21, 2016, which is incorporated herein by reference.

FIELD OF THE INVENTION

The present invention is directed to systems and methods for removing products from a power generation cycle. Particularly, systems and methods are provided that remove acid gas pollutants from a power generation cycle that utilizes a high pressure recirculating working fluid.

BACKGROUND OF THE INVENTION

Systems and methods for generating power that utilize the combustion of fossil fuel(s) with carbon dioxide as a working fluid are described in U.S. Pat. No. 8,596,075, which is incorporated herein by reference in its entirety. Estimates indicate that fossil fuel(s) will continue to provide the bulk of the world's electric power requirements for the next 100 years as non-carbon power sources are developed and deployed. Known methods of power generation through the combustion of hydrocarbon fuels, such as fossil fuel(s) and/or suitable biomass, however, are limited by rising energy costs and a desire to decrease production and emission of carbon dioxide ($CO_2$). Global warming is increasingly viewed as a potentially catastrophic consequence of increased emissions of $CO_2$ by developed and developing nations. Solar and wind power are probably incapable of replacing, in the near future, power generated from the combustion of fossil fuel(s) and/or other hydrocarbon fuels. Additionally, nuclear power has associated dangers, which include proliferation of nuclear materials and disposal of nuclear waste.

Power generated from combustion as noted above is now increasingly burdened with desires for capturing high pressure $CO_2$ for delivery to sequestration sites, enhanced oil recovery operations, and/or general pipeline injection for reuse. This desire for capturing $CO_2$ is difficult to fulfill with current power generation systems and methods, such as high efficiency combined cycle plants; the incurred parasitic load of capturing $CO_2$ may result in very low thermal efficiencies. Moreover, capital costs are high for achieving the desired level of $CO_2$ capture. These and other complications result in significantly higher electricity costs (e.g., an increase of as much as 50-70%) compared to systems that emit $CO_2$ to the atmosphere. An increasingly warming planet and/or carbon emission taxation could catastrophically impact the environment and the economics of power generation. Accordingly, a need exists in the art for systems and methods that provide high efficiency power generation with a reduction in $CO_2$ emission by capturing $CO_2$, which may provide for lower electricity costs and improved ease of sequestering and storing captured $CO_2$.

One approach to overcoming the thermodynamic burden of recapturing $CO_2$ is a high efficiency power generation cycle that employs a substantially pure $CO_2$ working fluid having pressures suitable for pipeline injection. This approach has gained increasing popularity, with designs employing recirculating trans-critical, supercritical, and/or ultra-supercritical working fluids. These working fluids, which primarily include oxy-combustion formed $CO_2$, are maintained in operational windows that, at points within the power generation cycle, coincide with pressures and temperatures suitable for pipeline injection. At these coincidental points, $CO_2$ may be safely vented from the power generation cycle to a pipeline and/or downstream reuse process that requires such a highly pressurized and purified $CO_2$, while still maintaining high efficiencies within the power generation cycle.

One such power generation cycle may utilize the oxy-combustion of a hydrocarbon fuel to power a fully recuperated, trans-critical carbon dioxide working fluid in a Brayton-style power generation cycle, which is disclosed in previously mentioned U.S. Pat. No. 8,596,075. In various aspects, the power generation cycle inherently captures substantially 100% of the $CO_2$ formed from the combustion of a hydrocarbon fuel that has a desired sequestration or pipeline pressure. Further, the captured $CO_2$ has a substantially high purity. In aspects where natural gas is used as the combustible fuel, such a power generation cycle can achieve thermal efficiencies that are substantially equivalent to efficiencies obtained in general combined cycle systems without a reduction in the efficiency of capturing $CO_2$ at pressures up to and beyond 300 bar. In particular, when the combustible fuel utilized contains low concentrations of sulfur and nitrogen, such as natural gas, the $CO_2$ produced from the cycle may be vented to a $CO_2$ pipeline at the required molar purities with little to no additional post-treatment steps.

Solid combustion fuels, such as coals of varying rank, pet-coke, bitumen or biomass, may contain elevated concentrations of sulfur, nitrogen, and other fuel derived impurities. When such fuels are utilized, they must first be gasified with substantially pure oxygen in a high pressure gasifier to produce a fuel gas. The fuel gas is then cleaned of any remaining particulate, cooled, compressed to the required combustion pressure, and then introduced to the combustor of the power generation cycle for oxy-fuel combustion. Additionally, sour natural gas containing elevated concentrations of sulfur-containing compounds can be utilized. Fuel derived impurities, such as sulfur and nitrogen containing compounds, are not removed from the fuel gas prior to oxidation. As such, the fuel gas retains substantial concentrations of impurities that may include $H_2S$, COS, $CS_2$, $NH_3$, HCN, Hg, and other trace components depending on the primary fuel source.

Oxyfuel-type combustion of fuel gas produces a relatively pure $CO_2$ stream, a quantity of water ($H_2O$), and any residual post-combustion compounds, which may include molecular oxygen ($O_2$). If an air separation unit is utilized in the power generation cycle, relatively low concentrations of molecular nitrogen ($N_2$) and argon (Ar) may be present, with nitrogen also originating from any designed air ingressions. Additionally, other oxidation reactions of sulfur and nitrogen-containing compounds may occur with remaining oxidant, which may be intentionally maintained in excess. This oxidation may result in the formation of several impurities, derived from either the primary fuel or partial oxidation process and produced in the oxy-fuel combustor and/or other high temperature regions of the power generation cycle. Impurities may include sulfur oxides ($SO_x$), such as sulfur dioxide ($SO_2$) and sulfur trioxide ($SO_3$), which form when fuel-derived sulfur is oxidized at high temperature. Other impurities may include nitrogen oxides ($NO_x$), such as nitrogen oxide (NO) and nitrogen dioxide ($NO_2$), which form primarily when nitrogen compounds contained in the fuel and/or air-derived nitrogen entering through system seals is oxidized at high temperature. Additionally, other trace impurities, such as Hg, may form during oxidation. These oxidized compounds of sulfur and nitrogen, which are known to be "acid gases" that are subject to environmental regulations as they are the main catalysts for producing acid rain, may also corrode equipment when present in their aqueous phase, and thus, a need exists to remove and/or maintain the oxidized compounds below certain threshold limits in at least some portions of the power generation cycle. These oxidized components should be removed from the power generation cycle to prevent emission of these toxic impurities to the atmosphere and to protect internal process equipment. Accordingly, combustion-derived gases that produce elevated concentrations of sulfur and nitrogen require post-treatment processing prior to recirculation and/or venting.

While several processes exist for removing sulfur and/or nitrogen from fuels prior to combustion (i.e., pre-combustion removal processes) or for removing trace acid gases from a process gas emitted at the end of the power generation cycle (i.e., post-combustion removal processes), a need exists for a removal process that advantageously utilizes the recirculating design of a power generation cycle, which employs a trans-critical, supercritical, and/or ultra-supercritical working fluid. Such a removal system may advantageously provide for the recycling of $CO_2$ into the power generation cycle at the desired ratios of recycled $CO_2$ concentrations to carbon in the fuel. Such a power generation cycle ideally provides for a controlled low concentration of impurities in the recycled $CO_2$ working fluid stream and/or the product $CO_2$ stream. The impurities may be removed in a form which allows for efficient sustainable disposal and protection of internal equipment. Such a removal process would ideally fill several process needs within a semi-closed loop process, such as cooling, condensing, and removal of pollutants from a recycled working fluid, being relatively inexpensive to build and maintain, having a low parasitic penalty, and employing a simple control and operational strategy.

U.S. Pat. No. 8,580,206 to Allam et al., which is incorporated herein by reference in its entirety, discloses methods of $SO_2$ and/or $NO_x$ removal from gaseous $CO_2$ at elevated pressure in the presence of molecular oxygen and water. In particular, a process is provided that utilizes a sequence of gas and/or liquid phase reaction steps where nitric oxide (NO) is oxidized to form nitrogen dioxide ($NO_2$) at an elevated partial pressure of the reactants. This oxidation process may control the overall rate of the reaction sequence. The $NO_2$ then oxidizes sulfur dioxide ($SO_2$) to form sulfur trioxide ($SO_3$), and the $NO_2$ is reduced back to NO. The $SO_3$ then dissolves in the liquid water to form sulfuric acid ($H_2SO_4$). The final result is the conversion of $SO_2$ to $H_2SO_4$ using $NO_x$ as a catalyst. The sequence of reactions is described by the equations listed below.

$$2NO+O_2=2NO_2 \qquad \text{Eq. A}$$

$$SO_2+NO_2=SO_3+NO \qquad \text{Eq. B}$$

$$SO_3+H_2O=H_2SO_4 \qquad \text{Eq. C}$$

Experimental data has confirmed theoretical reaction calculations, which indicate the $SO_2$ concentration can be reduced to very low levels (e.g., below 50 ppm (molar)) in less than 10 seconds when the $NO_x$ concentration is above 100 ppm and the pressure is above approximately 10 bar and the oxygen partial pressure is approximately 0.1 bar or higher. See, for example, Murciano, L., White, V., Petrocelli, F., Chadwick, D., "Sour compression process for removal of Sox and NOx from oxyfuel-derived CO2," Energy Procedia 4 (2011) pp. 908-916; and White, V., Wright, A., Tappe, S., and Yan, J., "The Air Products Vattenfall Oxyfuel CO2 Compression and Purification Pilot Plant at Schwarze Pumpe," Energy Procedia 37 (2013) 1490-1499, which are incorporated herein by reference in their entirety.

Additionally, U.S. Pat. No. 8,580,206 discloses the use of this known sequence of reactions for removing one or more contaminants, which may include $SO_2$ and/or $NO_x$, in a stream predominantly including $CO_2$ that is provided by an oxy-fuel power boiler that produces steam. In particular, the system includes a pulverized coal fired steam boiler and an oxy-fuel combustion system that recycles substantially all of the flue gas, apart from a net product $CO_2$ rich stream. The flue gas is mixed with the pure $O_2$ oxidant stream and provided to the coal fired combustors, which results in the concentration of $NO_x$ being forced to an equilibrium level based at least in part on the combustor adiabatic flame temperature. The combustor adiabatic flame temperature may be high enough to approximately reach near equilibrium conditions for a flue gas $NO_x$ concentration. There remains a further need in the art for systems and methods for removing pollutants, particularly acid gases, from output streams in power production.

SUMMARY OF THE INVENTION

The present invention, in various aspects, relates to methods and systems for removing pollutants from a power generation cycle. In particular, various aspects of the present disclosure may provide a system for removing acid gas pollutants from a power generation cycle, which includes a high efficiency combustor and turbine in series and a stream of a high pressure recirculating working fluid (e.g., a recirculating $CO_2$ working fluid). The system includes a first direct contact cooling tower (e.g. a direct contact reactor mass transfer column) configured to cool the high pressure recirculating working fluid. The first direct contact cooling tower is further configured to condense a fluid stream that removes $SO_2$ from the cooled high pressure recirculating working fluid. In another aspect, the first direct contact cooling tower may be configured to condense a fluid stream that removes $SO_2$ and if desired, a portion of $NO_x$ from the cooled high pressure recirculating working fluid. The system also includes a first recirculating pump in fluid communication with the first direct contact cooling tower. Additionally, an outlet to the first direct contact cooling tower is configured to dispense a cooled $CO_2$ product stream. The system also includes a second direct contact cooling tower (e.g. a direct contact reactor mass transfer column) configured to receive at least a portion of the cooled $CO_2$ product stream from the outlet of the first direct contact cooling tower. According to some aspects, the second direct contact cooling tower may be configured to receive at least a portion of the cooled $CO_2$ product stream after the cooled $CO_2$ product stream has circulated through a compressor and/or pump of a power generation system. The second direct contact cooling tower cools the $CO_2$ product stream and condenses a fluid stream that removes $NO_x$ and/or any residual $SO_x$ from the cooled $CO_2$ product stream. A second recirculating pump is in fluid communication with the second direct contact cooling tower.

In another aspect, a method is provided for removing pollutants from a power generation cycle, and in particular, for removing acid gas pollutants from a power generation cycle that utilizes a high efficiency combustor and turbine in series and a stream of a high pressure recirculating working fluid (e.g., a recirculating $CO_2$ working fluid). The method includes controlling the concentration of $NO_x$ in the high pressure recirculating working fluid being introduced to a first direct contact cooling tower. Additionally, the method includes cooling the high pressure recirculating working fluid in the first direct contact cooling tower. The method may include condensing a fluid stream configured to remove $SO_2$ from the cooled high pressure recirculating working fluid in the first direct contact cooling tower. The method also may include extracting the cooled high pressure recirculating working fluid from the first direct contact cooling tower as a $CO_2$ product stream and dividing the $CO_2$ product stream into a recycled recirculating working fluid stream and a net $CO_2$ product stream. The method includes providing the net $CO_2$ product stream to the second direct contact cooling tower. Additionally, the method may include providing a pure water stream to the second direct contact cooling tower. In various aspects, the method includes cooling the net $CO_2$ product stream in the second direct contact cooling tower and condensing a fluid stream that removes $NO_x$ and/or any residual $SO_x$ from the cooled net $CO_2$ product stream in the second direct contact cooling tower. The method also includes extracting a purified $CO_2$ product stream from the second direct contacting cooling tower.

In one aspect, the high pressure recirculating fluid may be introduced into a combustor along with a fuel and oxidant for combustion such that a high pressure, high temperature fluid stream is produced that includes the recirculating $CO_2$ working fluid and a plurality of combustion products. This mixture of combustion products and recirculating $CO_2$ working fluid may include acid gases, such as $NO_x$ and $SO_2$, and other trace impurities, such as mercury (Hg). The resulting fluid stream may be introduced into a power generation device, such as a turbine, followed by high temperature heat recovery to an incoming stream via a recuperative heat exchanger, which heats the incoming high pressure recirculating $CO_2$ working fluid while cooling the turbine exhaust gas.

In one aspect, prior to venting in the power generation cycle, combustion derived water and/or acid gas pollutants, such as $SO_2$ and $NO_x$, may be removed in order to meet acceptable sequestration and/or pipeline product specifications for reuse and/or injection of $CO_2$ into wells for tertiary oil recovery. Removal of $SO_2$ and/or $NO_x$ from the recycled $CO_2$ recirculating working fluid stream may further protect system components from corrosion caused by the formation of corrosive aqueous acids, such as sulfuric acid ($H_2SO_4$) and/or nitric acid ($HNO_3$).

According to some aspects, it may be desirable to cool the $CO_2$ working fluid exiting a recuperative heat exchanger to a sufficiently low temperature to remove condensed water and to provide for efficient compressing and pumping of the recycled $CO_2$ working fluid to a desired high recirculating pressure. Additionally, it may be desirable to remove $CO_2$ formed from the combustion cycle as a $CO_2$ product stream having the desired purity specifications, as described herein.

In some aspects, a system may include two vapor/liquid multi-stage contacting devices (e.g., direct contact reactor mass transfer columns). The first direct contact reactor mass transfer column may function as a direct contact $CO_2$ gas cooler and acid gas removal device. The first column may be embedded within the primary recirculating process in which most of the remaining water vapor in the lower pressure $CO_2$ stream is condensed as the $CO_2$ gas is cooled to near atmospheric temperature. The catalytic gas and liquid phase reactions described herein may occur within this first column. In particular, the catalytic reactions may occur when excess oxygen having a partial pressure of at least 0.1 bar exists and a substantial concentration of $NO_x$ (i.e., at least 100 ppm) is present. Additionally, the catalytic reactions may occur in the first column when the level of contacting between gas to liquid water is sufficient and a suitable residence time is provided for the reactions involving the conversion of $SO_2$ to $H_2SO_4$ to proceed to completion.

According to some aspects, a second direct contact reactor mass transfer column may provide for the processing of the net $CO_2$ product stream that is continuously vented from the recirculating process. The net $CO_2$ product stream may have a $SO_2$ concentration below about 50 ppm. Additionally, the net $CO_2$ product stream may have an elevated $NO_x$ concentration. In some aspects, it may be desirable to lower the $NO_x$ concentration to below about 20 ppm and preferably to below about 10 ppm before the net $CO_2$ product stream is collected as a final gas product.

An important factor in the various aspects of the present disclosure is maintaining a high concentration of $NO_x$ in the turbine and in the recuperative heat exchanger discharge stream, which implies that a large portion of $NO_x$ must be retained in the recirculating fluid. Maintaining the desired high concentration of $NO_x$ in the turbine and recuperative heat exchange discharge stream may provide for the completion of the sequence of catalytic gas reactions in the first direct contact reactor mass transfer column in a minimum residence time. In some aspects, the concentration of $NO_x$ is maintained at the elevated desired levels in the stream as the reaction conditions in the first column are adjusted to provide an exit stream having a suitably low $SO_2$ concentration and a limited amount of time for any $NO_x$ to react with oxygen and water to constrain the removal of any $NO_x$ from the stream. As such, the amount of $NO_x$ converted to $HNO_3$ in the first column is kept to a minimum. In some aspects, about less than 10% of the $NO_x$ in the high pressure recycled $CO_2$ product stream leaving the first column is converted to $HNO_3$. According to another aspect, about less than 5% of the $NO_x$ in the high pressure recycled $CO_2$ product stream leaving the first column is converted to $HNO_3$. The limited conversion of $NO_x$ to $HNO_3$ in the first column may result in a first exit stream from the first column that substantially includes $H_2SO_4$ and a second exit stream from the first column that substantially includes a high pressure recycled $CO_2$ stream having a high concentration of $NO_x$.

In some aspects, the power generation cycle may provide for additional production of $NO_x$ in the fuel combustion section where the pure oxygen feed is diluted with $CO_2$ to provide an $O_2$ composition of typically about 15%-35% (molar) and an adiabatic combustion temperature in the range of approximately 1800° C. to approximately 2500° C. The recycled $CO_2$ working fluid stream may then be mixed with the combustion products in the combustor to provide a typical mixed temperature of approximately 1150° C., which may not result in any significant formation or destruction of $NO_x$ in the mixed turbine inlet stream. This lack of significant formation and/or destruction of $NO_x$ in the mixed turbine inlet stream is one characteristic of the various aspects of the present disclosure, which are specifically targeted to power generation cycles utilizing $CO_2$ as the working fluid. Such power generation cycles recycle a large quantity of preheated high pressure $CO_2$, which mixes with the combustion products after combustion and prior to the combined stream entering the power turbine.

Various aspects described herein provide for independently controlling the concentration of $NO_x$ in the recycle $CO_2$ stream. This independent control of the $NO_x$ concentration allows for minimization of contact residence time and size in the first direct contact reactor mass transfer column, which may provide for the concentration of $NO_x$ in the low pressure $CO_2$ stream to remain substantially constant with only a small fraction, such as approximately between 3% to 20% for a coal-fired power generation cycle, to be lost as nitric acid that is removed from the net $CO_2$ product stream in the first direct contact reactor mass transfer column. The loss of the small amount of $NO_x$ may be compensated by a small amount of $NO_x$ formed in the power cycle combustor and/or, in some aspects, by a $NO_x$ generator that may utilize ammonia oxidation over a catalyst. The passage through the turbine may also provide a temperature drop to approximately 750° C. with no change in the concentration of $NO_x$.

The known sequence of reactions forming nitric acid in the second contactor is as follows:

$$2NO+O_2=2NO_2 \quad \text{Eq. D}$$

$$2NO_2+H_2O=HNO_2+HNO_3 \quad \text{Eq. E}$$

$$3HNO2=HNO_3+2NO+H_2O \quad \text{Eq. F}$$

The product gas leaving the second direct contact reactor mass transfer column is thus substantially free of $SO_2$ and $NO_x$. In some aspects, the $H_2SO_4$ can be easily converted to a gypsum, a soft sulfate mineral composed of calcium sulfate dihydrate ($CaSO_4.2H_2O$) by reacting the $H_2SO_4$ with limestone in a continuous stirred tank reactor, which results in the formation of a non-leachable solid gypsum product for commercial use or disposal after dewatering. The second column, which may have a relatively high concentration of nitric acid, may remove mercury by directly converting the mercury with the nitric acid to mercuric nitrate.

Various aspects of the present disclosure provide for the utilization of a sequence of known reactions for separating an amount of $SO_2$ from the total combustion products leaving the power turbine of a power generation cycle that utilizes recycled $CO_2$ as the working fluid. One aspect may provide for a high pressure recycle $CO_2$ stream that enters a recuperator heat exchanger of the power generation cycle that is substantially free of $SO_2$ contamination. Another aspect may provide a product $CO_2$ stream from the power generation cycle that is substantially free of both $SO_2$ and $NO_x$ contamination. Additionally, the product $CO_2$ stream from the power generation cycle may be substantially free of mercury that is derived from the primary fuel.

Aspects of the present disclosure provide a system for removing pollutants that allows recirculating, recuperated, oxy-combustion, trans-critical $CO_2$ power generation cycles to utilize fuels containing elevated sulfur, nitrogen and/or other fuel derived impurities and to operate with substantially complete removal of these impurities. The substantially complete removal of these pollutants protects internal process equipment and ultimately provides a product $CO_2$ stream which is substantially free of $SO_2$, $NO_x$, Hg, and/or other impurities, while providing efficient functionality for fulfilling other process/cycle objectives.

According to yet another aspect, a method for the removal of $SO_2$ and nitrogen oxides NO and $NO_2$ from a power generation system is provided. The power generation system may use $CO_2$ as the working fluid in a recuperated Brayton cycle having a combustor in which a gaseous fuel containing at least $H_2S$, $NH_3$, $HCNH_2$, and/or $COCH_4$ is burned with pure $O_2$ followed by mixing of the combustion gases, which now contain the oxidized components of $SO_2$ and/or NO, with a lower temperature $CO_2$ recycle stream, which has been heated in the recuperated heat exchanger of the Brayton power cycle. The combined stream then passes through a power producing turbine which discharges through the recuperative heat exchanger thus heating the $CO_2$ recycle stream. The $SO_2$ removal may be accomplished by the reactions between NO and $O_2$, which may form $NO_2$ followed by the reaction of $NO_2$ with $SO_2$, which may form $SO_3$ and regenerating the NO, which may be followed by the reaction of $SO_3$ and $H_2O$ to form $H_2SO_4$. The NO and $NO_2$ removal following the removal of $SO_2$ may be accomplished by the reactions between NO oxidized by $O_2$ to form $NO_2$ and water forming $HNO_2$ and/or $HNO_3$, which may be followed by the conversion of $HNO_2$ to $HNO_3$ and NO plus water. The method may be characterized by operating the $SO_2$ removal reactions in a first vapor/liquid multi-stage contacting unit in which the $SO_2$ level is reduced to below about 50 ppm and less than about 10% of the NO in the feed stream is converted to nitric acid. In another aspect, the method may be characterized by operating the $SO_2$ removal reactions in a first vapor/liquid multi-stage contacting unit in which the $SO_2$ level is reduced to below about 50 ppm and less than about 5% of the NO in the feed stream is converted to nitric acid. Further, the method may further include maintaining a controlled nitrogen oxides concentration in the $CO_2$ feed to the first liquid/vapor multi-stage contacting unit at a level which allows for the removal of $SO_2$ and the loss of nitric acid in the first liquid/vapor multi-stage contacting unit to be maintained at required values. The method may further include controlling the nitrogen oxides concentration in the inlet to the first liquid/vapor multi-stage contacting unit by the addition of fresh NO from the combustor $NO_x$ formation and adding additional nitrogen oxides from an external source and allowing the nitrogen oxides concentration to rise to the desired value via an accumulation effect. The method may also include maintaining and controlling the nitrogen oxides concentration in the turbine exhaust, which after cooling forms the inlet stream to the first liquid/vapor multi-stage contacting unit by mixing the high pressure $CO_2$ recycle stream at a temperature between about 500° C. and about 800° C. with the combustion products resulting in a mixed temperature at the turbine inlet between about 900° C. and about 1200° C. so that there is less than 5% change in the quantity of $NO_x$ entering and leaving the combustor. The method may further include taking the net $CO_2$ product stream from the gas stream leaving the first liquid/vapor multi-stage contacting unit and passing the net $CO_2$ product stream through a second counter-current gas/liquid contactor which has a residence time sufficiently high enough to allow for the removal of nitrogen oxides from the net $CO_2$ product gases to below about 25 ppm. The method may further include providing each contacting unit/contactor with a liquid pump that includes a pump and a cooler, which provides each contacting unit/contactor with a reflux liquid stream. The method may also include using the combination of varying liquid reflux rates and varying the nitrogen oxides inlet concentration to the first liquid/vapor multi-stage contacting unit to control the reaction in the first liquid/vapor multi-stage contacting unit so as to achieve the desired removal of $SO_2$ with the desired low level of $HNO_3$ formation. The method may also include controlling the reflux rate in the second counter-current gas/liquid contactor so as to achieve the desired low concentration of nitrogen oxides in the net $CO_2$ product stream.

In one or more embodiments, a method according to the present disclosure can be particularly directed to removing an acid gas from a power cycle product stream. The power production cycle stream can be a stream from a power production cycle that utilizes a recycled $CO_2$ working fluid, and the stream specifically can be a combustion product stream that optionally has been expanded for power production and/or optionally has been passed through a recuperator heat exchanger to reduce the temperature thereof. Suitable power production cycles (including both systems and methods of use thereof) are described in U.S. Pat. No. 9,068,743 to Palmer et al., U.S. Pat. No. 9,062,608 to Allam et al., U.S. Pat. No. 8,986,002 to Palmer et al., U.S. Pat. No. 8,959,887 to Allam et al., U.S. Pat. No. 8,869,889 to Palmer et al., U.S. Pat. No. 8,776,532 to Allam et al., and U.S. Pat. No. 8,596,075 to Allam et al, the disclosures of which are incorporated herein by reference.

In some embodiments, a method according to the present disclosure can comprise the following steps:

carrying out a power production cycle;

directing a product stream containing $CO_2$, $SO_x$, and $NO_x$ from the power production cycle into a first direct contact cooling tower;

contacting the product stream containing $CO_2$, $SO_x$, and $NO_x$ in the first direct contact cooling tower with a first counter-current circulating aqueous liquid stream;

removing at least a portion of $SO_2$ present in the product stream in the first direct contact cooling tower via reaction between the $SO_2$ and $NO_2$ in the product stream in the presence of the aqueous liquid stream;

withdrawing from the first direct contact cooling tower a recycle stream containing $CO_2$ and $NO_x$; and delivering at least a portion of the recycle stream containing $CO_2$ and $NO_x$ back into the power production cycle In one or more embodiments, a method as noted above can encompass one or more of the following statements, which statements can be combined in any number and order.

The first counter-current circulating aqueous liquid stream can comprise $H_2SO_4$. For example, the first counter-current circulating aqueous liquid stream can be a stream of water with a content of $H_2SO_4$ included therein.

The product stream containing $CO_2$, $SO_x$, and $NO_x$ can contain at least 10 ppm $NO_x$ based on the total mass of the product stream containing $CO_2$, $SO_x$, and $NO_x$. As further described herein, the product stream preferably includes at least this content of $NO_x$ in order to facilitate removal of $SO_2$ in the first direct contact cooling tower.

The product stream containing $CO_2$, $SO_x$, and $NO_x$ can contain at least 15 ppm, at least 20 ppm, or at least 25 ppm $NO_x$ based on the total mass of the product stream containing $CO_2$, $SO_x$, and $NO_x$. Such ranges are understood to include an upper limit that may be calculated based upon the further reaction conditions. For example, an upper limit can be 200 ppm, 500 ppm, 1000 ppm, or 5000 ppm based on the total mass of the product stream containing $CO_2$, $SO_x$, and $NO_x$.

The product stream containing $CO_2$, $SO_x$, and $NO_x$ can contain about 10 ppm to about 1000 ppm, about 12 ppm to about 750 ppm, or about 15 ppm to about 500 ppm $NO_x$ based on the total mass of the product stream containing $CO_2$, $SO_x$, and $NO_x$. If desired, a narrower range may also be utilized, such as a range of about 10 ppm to about 150 ppm or about 10 ppm to about 100 ppm of $NO_x$ based on the total mass of the product stream containing $CO_2$, $SO_x$, and $NO_x$.

The NOx concentration in the product stream containing $CO_2$, $SO_x$, and $NO_x$ can be controlled within a range such that less than 50% by mass of the $NO_x$ in the product stream containing $CO_2$, $SO_x$, and $NO_x$ is converted to $HNO_3$ in the first direct contact cooling tower. The above NOx concentration ranges can specifically be useful to prevent excess conversion of $NO_x$ to $HNO_3$ in the first direct contact cooling tower. Preferably, less than 25%, less than 20%, less than 15%, less than 10%, less than 5%, or less than 1% by mass of the $NO_x$ in the product stream containing $CO_2$, $SO_x$, and $NO_x$ is converted to $HNO_3$ in the first direct contact cooling tower. In some embodiments, substantially none of the $NO_x$ in the product stream containing $CO_2$, $SO_x$, and $NO_x$ is converted to $HNO_3$ in the first direct contact cooling tower. In such embodiments, it is understood that "substantially none" includes 0 up to 0.5% by mass of the $NO_x$ in the product stream containing $CO_2$, $SO_x$, and $NO_x$.

The recycle stream containing $CO_2$ and $NO_x$ that is withdrawn from the first direct contact cooling tower can include at least 90% by mass of the NOx present in the product stream containing $CO_2$, $SO_x$, and $NO_x$ that is introduced into the first direct contact cooling tower. In some embodiments, the recycle stream containing $CO_2$ and $NO_x$ that is withdrawn from the first direct contact cooling tower can include at least 50%, at least 75%, at least 90%, at least 95%, at least 98%, or at least 99% by mass of the NOx present in the product stream containing $CO_2$, $SO_x$, and $NO_x$ that is introduced into the first direct contact cooling tower.

The recycle stream containing $CO_2$ and $NO_x$ that is withdrawn from the first direct contact cooling tower can include substantially no $SO_2$, wherein it is understood that "substantially no" $SO_2$ can include trace amounts, such as less than 5 ppm based on the total mass of the recycle stream containing $CO_2$ and $NO_x$. In some embodiments, the recycle stream containing $CO_2$ and $NO_x$ that is withdrawn from the first direct contact cooling tower can contain $SO_2$ in an amount of less than 100 ppm, less than 50 ppm, less than 25 ppm, or less than 15 ppm based on the total mass of the recycle stream containing $CO_2$ and $NO_x$.

The concentration of $NO_x$ in the product stream containing $CO_2$, $SO_x$, and $NO_x$ can be adjusted by adding NOx upstream from the first direct contact cooling tower. For example, $NO_x$ can be added upstream from the first direct contact cooling tower by combining a nitrogen source with a fuel and an oxidant in a combustor upstream from the first direct contact cooling tower. As a further example, $NO_x$ can be added directly to the product stream containing $CO_2$, $SO_x$, and $NO_x$ upstream from the first direct contact cooling tower. More particularly, $NO_x$ that is added directly to the product stream containing $CO_2$, $SO_x$, and $NO_x$ upstream from the first direct contact cooling tower can be generated from ammonia, such as in a catalytic reactor. It is understood, however, that the appropriate amount of $NO_x$ in the product stream containing $CO_2$, $SO_x$, and $NO_x$ can be achieved through utilization of fuel that contains a sufficient amount of nitrogen.

The concentration of $NO_x$ in the product stream containing $CO_2$, $SO_x$, and $NO_x$ can be adjusted by increasing or decreasing a discharge flow from a first recirculating pump that is configured to receive a liquid product stream from the first direct contact cooling tower and recirculate the liquid product stream into the first direct contact cooling tower.

The method can be configured such that at least a portion of the $NO_x$ in the recycle stream containing $CO_2$ and $NO_x$ is directed back into the power production cycle.

The recycle stream containing $CO_2$ and $NO_x$ can be divided into a recirculating working fluid stream that is directed back into the power production cycle and a net $CO_2$ product stream.

The method can further comprise the following steps:

directing at least a portion of the recycle stream containing $CO_2$ and $NO_x$ into a second direct contact cooling tower;

contacting the recycle stream containing $CO_2$ and $NO_x$ in the second direct contact cooling tower with a second counter-current circulating aqueous liquid stream; removing at least a portion of $NO_2$ from the recycle stream containing $CO_2$ and $NO_x$ in the second direct contact cooling tower via reaction between the $NO_2$ and water; and withdrawing from the second direct contacting cooling tower a stream containing $CO_2$.

The second counter-current circulating aqueous liquid stream can comprise $HNO_3$.

The method further can comprise adding $O_2$ to the recycle stream containing $CO_2$ and $NO_x$ prior to directing the recycle stream containing $CO_2$ and $NO_x$ into the second direct contact cooling tower.

The method further can comprise compressing the recycle stream containing $CO_2$ and $NO_x$ prior to directing the recycle stream containing $CO_2$ and $NO_x$ into the second direct contact cooling tower.

Prior to directing at least a portion of the recycle stream containing $CO_2$ and $NO_x$ into the second direct contact cooling tower, the recycle stream containing $CO_2$ and $NO_x$ can be compressed utilizing a compressor in the power production cycle.

The recycle stream containing $CO_2$ and $NO_x$ can be divided into a recirculating portion that is directed back into the power production cycle and a net production portion that is directed to the second direct contact cooling tower.

As evident from the foregoing, the present disclosure further relates to a system that is configured for removing an acid gas from a power cycle product stream. Such system can include any element that is described as being suitable for use according to the methods described herein. In one or more embodiments, a system according to the present disclosure can comprise the following:

a transfer element configured to deliver a power cycle product stream containing $CO_2$, $SO_x$, and $NO_x$ from a component of a power cycle;

a first direct contact cooling tower configured to receive the power cycle product stream containing $CO_2$, $SO_x$, and $NO_x$ from the component of the power cycle under reaction conditions such that at least a portion of $SO_2$ is removed therefrom and a recycle stream containing $CO_2$ and $NO_x$ is output from the first direct contact cooling tower;

a first recirculating pump in fluid communication with the first direct contact cooling tower configured to receive a liquid stream from the first direct contact cooling tower and recirculate at least a portion of the liquid stream to the first direct contact cooling tower; and a transfer element configured to deliver at least a portion of the recycle stream containing $CO_2$ and $NO_x$ to a component of the power cycle.

In one or more embodiments, a system as noted above can encompass one or more of the following statements, which statements can be combined in any number and order.

The system further can comprise a second direct contact cooling tower configured to receive at least a portion of the recycle stream containing $CO_2$ and $NO_x$ from the first direct contact cooling tower under reaction conditions such that at least a portion of $NO_2$ in the recycle stream containing $CO_2$ and $NO_x$ is removed therefrom and a stream containing $CO_2$ is output from the second direct contact cooling tower.

The system further can comprise a second recirculating pump in fluid communication with the second direct contact cooling tower configured to receive a liquid stream from the second direct contact cooling tower and recirculate at least a portion of the liquid stream to the second direct contact cooling tower.

The system further can comprise an $O_2$ input positioned upstream from the second direct contact cooling tower and downstream from the first direct contact cooling tower.

The system further can comprise a compressor positioned upstream from the second direct contact cooling tower and downstream from the first direct contact cooling tower.

BRIEF DESCRIPTION OF THE DRAWING(S)

Having thus described the disclosure in the foregoing general terms, reference will now be made to accompanying drawings, which are not necessarily drawn to scale, and wherein:

Figure 2:
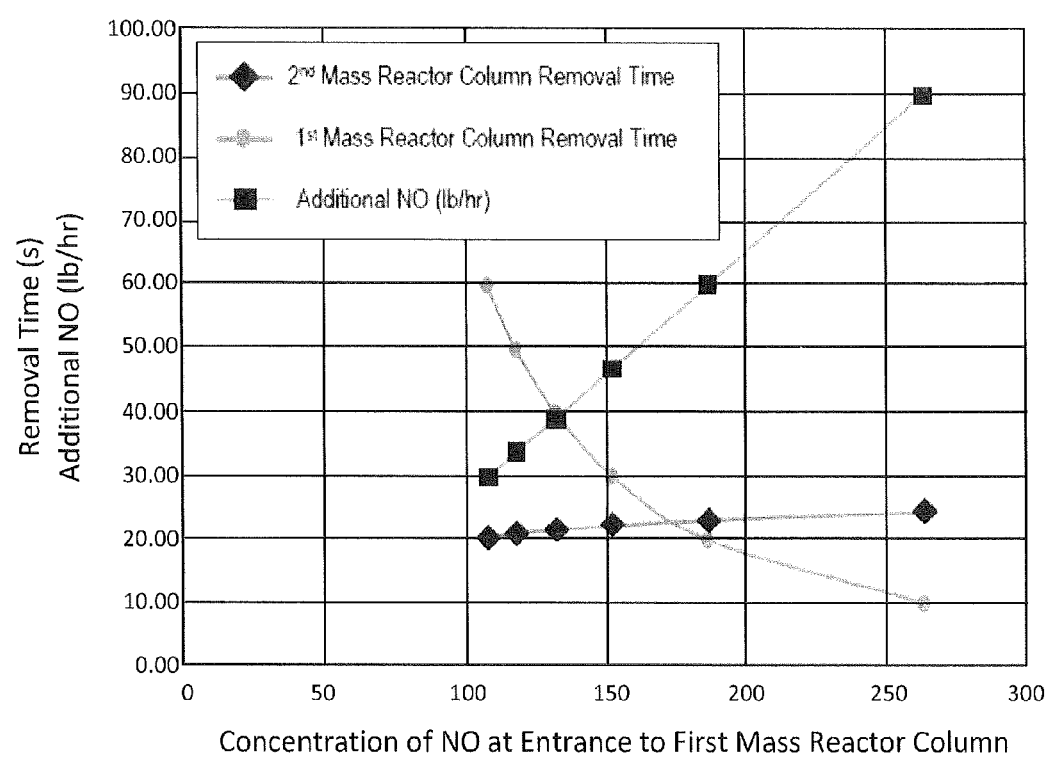
Figure 3:
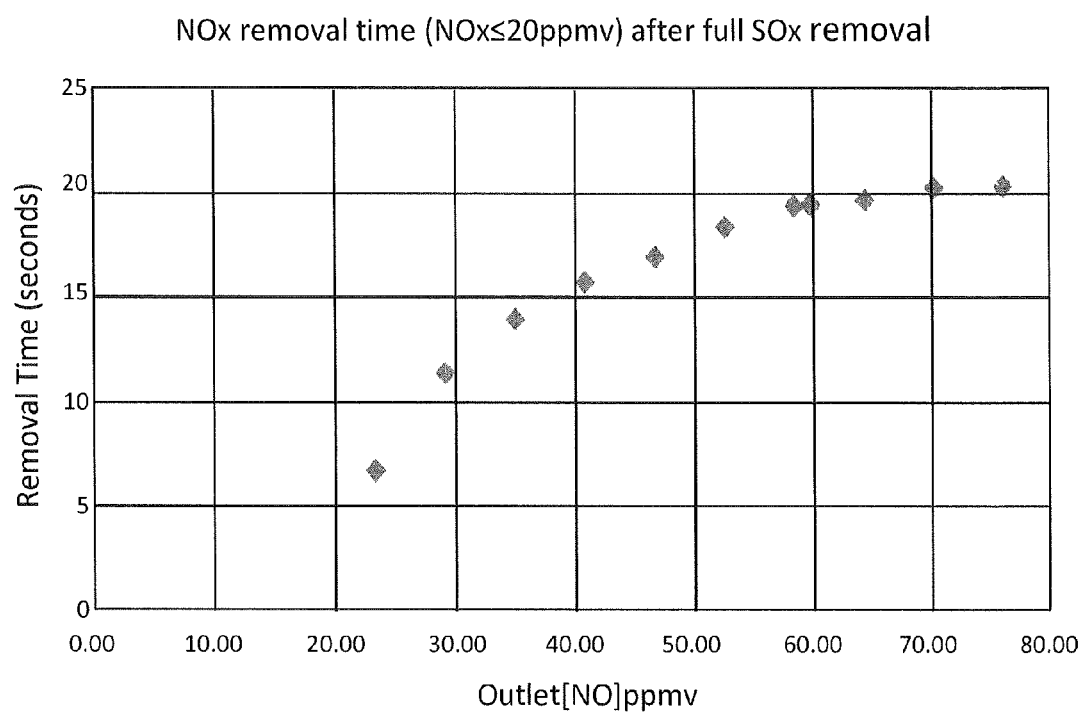

FIG. 2 illustrates a graphical representation of the removal time of $SO_x$ and $NO_x$ in the first and second direct contact reactor mass transfer columns respectively with respect to increasing concentration levels of NO at the entrance to a first direct contact reactor mass transfer column, according to one aspect of the present disclosure; and FIG. 3 illustrates a graphical representation of the residence time of $NO_x$ removal after full $SO_x$ removal with respect to a desired NO outlet concentration in a second direct contact reactor mass transfer column, according to one aspect of the present disclosure.

DETAILED DESCRIPTION

The present disclosure will now be described more fully hereinafter with reference to exemplary aspects thereof. These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

Figure 1A:
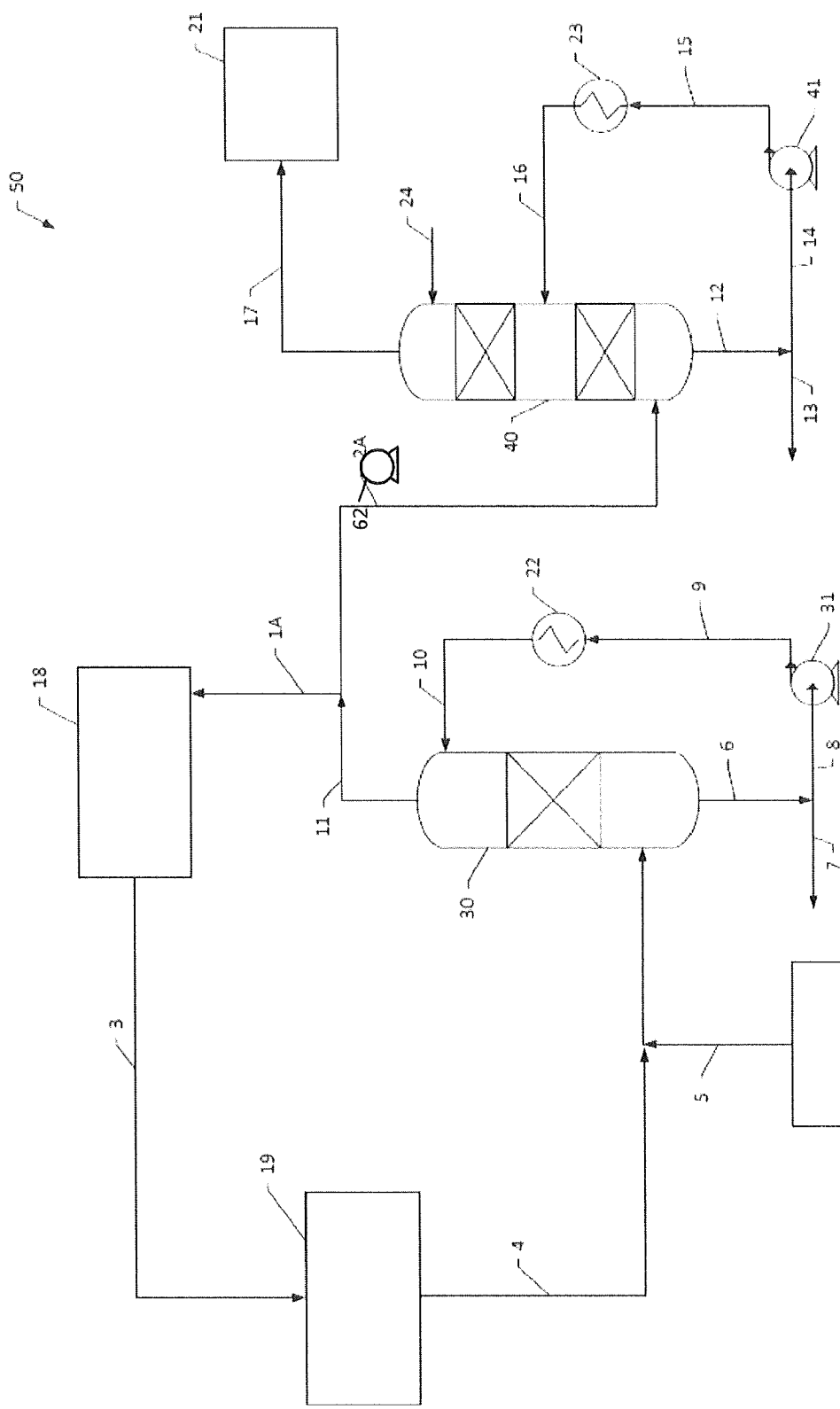
FIG. 1A illustrates a schematic flow diagram of a power generation system, which includes a high efficiency combustor and turbine in series in combination with a high pressure recirculating fluid, configured to remove acid gas pollutants from the system, according to one aspect of the present disclosure.
Figure 1B:
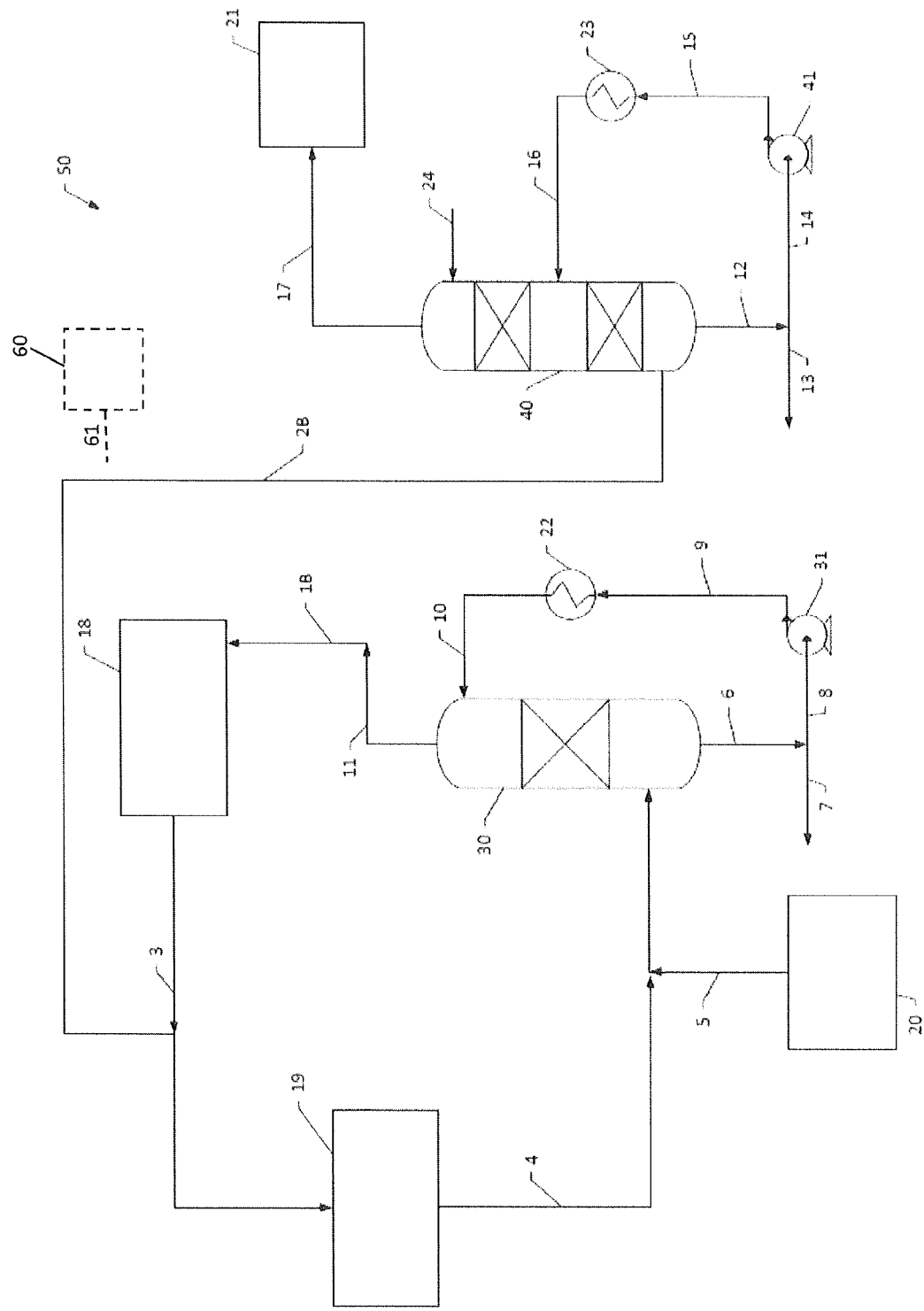
FIG. 1B illustrates a schematic flow diagram of a power generation system, which includes a high efficiency combustor and turbine in series in combination with a high pressure recirculating fluid, configured to remove acid gas pollutants from the system, according to one aspect of the present disclosure.

The present disclosure is directed to a power generation system configured to remove pollutants from the power generation system. As shown in FIGS. 1A and 1B, a system 50 for removing particular acid gases from a power generation system 18, 19 may be configured to remove particular acid gas pollutants (e.g., $SO_x$, $NO_x$, and/or the like) from the power generation system 18, 19. In FIGS. 1A and 1B, Block 19 illustrates generic components of a power generation system, which may include in one aspect, a combustor, a turbine, and a heat exchanger. Likewise, Block 18 illustrates additional generic components of a power generation system such as, for example, a compressor and/or a pump. The power generation system 18, 19 can utilize a fuel gas such as, for example, a hydrocarbon fuel gas. In some aspects the utilized fuel may be considered an unprocessed or minimally processed sour or unsweetened gas containing methane and longer chain hydrocarbon molecules in addition to sulfur, nitrogen and/or other fuel derived impurities which may include hydrogen sulfide ($H_2S$), carbonyl sulfide (COS), carbon disulfide ($CS_2$), ammonia ($NH_3$), hydrogen cyanide (HCN), and/or mercury (Hg), all of which are in a reduced form. In some aspects, the power generation system 18, 19 may utilize a fuel gas that predominantly includes carbon monoxide and hydrogen along with impurities, which may include hydrogen sulfide ($H_2S$), carbonyl sulfide (COS), carbon disulfide ($CS_2$), ammonia ($NH_3$), hydrogen cyanide (HCN), and/or mercury (Hg), all of which are in a reduced form.

The fuel gas may be produced by any known method. As an example for purposes of illustration only, the fuel gas may be produced in an oxygen based coal gasifier such as a GE-Texaco water quench gasifier, with complete ash removal followed by fuel gas cooling with heat transfer to the power cycle, condensed water removal and fuel gas compression to a pressure of, for example, approximately 320 bar.

The fuel gas (regardless of whether it is formed as illustrated above or is an unprocessed or minimally processed sour or unsweetened gas as noted above) is burned in the combustor of the power generation system in a stream that includes an oxidant, which preferably is a combination of $O_2$ and $CO_2$ (in some embodiments, a mixture of approximately 25% $O_2$ and 75% $CO_2$ (molar)). This results in a combustion product that includes $CO_2$, $H_2O$, and $O_2$. Preferably, the combustion product stream includes 2% (molar) excess $O_2$. A relatively large quantity of recycled $CO_2$ (e.g., at a pressure of approximately 300 bar and at a temperature of approximately 720° C.) is mixed with the combustion product (e.g., in the combustor) to produce a combined combustion product stream (e.g., at a temperature of approximately 1150° C. and a pressure of approximately 300 bar). This combustion product stream is reduced in pressure (e.g., to approximately 30 bar with a discharge temperature of approximately 750° C.) as it passes through the power generation system turbine. The stream is then subsequently cooled in a recuperative heat exchanger against a heating recycle $CO_2$ stream. It is understood that the foregoing provides an exemplary set of process conditions, and temperatures, pressures, etc. may be adjusted as necessary.

Stream 4 leaves the cold end of a recuperative heat exchanger in Block 19 at a substantially reduced temperature (e.g., about 65° C.) and pressure (e.g., about 29 bar). At this point the composition of the stream is predominantly $CO_2$ with a quantity of water ($H_2O$), which is substantially in the liquid phase (e.g., about 85% by weight) with some quantity remaining in the vapor phase. Additionally, the stream 4 contains oxidized compounds of sulfur and nitrogen ($SO_x$ and $NO_x$) with other trace components such as mercury (Hg) derived from oxidation of the impurities in the fuel gas.

The combustion product stream exiting Block 19 can include a content of $NO_x$ or it may be substantially free of NOx. It is desirable to control the NOx content in stream 4 so that the NOx content is sufficiently high to react with $SO_x$ as further described herein. In various embodiments, the combustion product stream (e.g., stream 4) that enters a first direct contact reactor mass transfer column 30 (as described below) can particularly comprise $CO_2$, $SO_x$, and $NO_x$. It is understood that the term $SO_x$ indicates the presence of any sulfur oxide and is not limited to a particular sulfur oxide unless otherwise specifically indicated (such as reference to a $SO_x$ containing stream that particularly includes $SO_2$). A stream containing $SO_x$ may contain a single sulfur oxide species or a mixture of sulfur oxide species. It is likewise understood that the term $NO_x$ indicates the presence of any nitrogen oxide and is not limited to a particular nitrogen oxide unless otherwise specifically indicated (such as reference to a $NO_x$ containing stream that particularly includes $NO_2$). A stream containing $NO_x$ may contain a single nitrogen oxide species or a mixture of nitrogen oxide species. Reference to acid gas removal can particularly indicate removal of one or both of $SO_x$ and $NO_x$.

As shown in FIGS. 1A and 1B, the power generation system 18, 19 with an acid gas pollutant removal system 50 may include two direct contact reactor mass transfer columns. A first mass transfer column 30 may be configured to remove $SO_2$ in the form of $H_2SO_4$ from the net $CO_2$ product stream, while the second mass transfer column 40 may be configured to remove NO and/or $NO_2$ in the form of $HNO_3$ from the net $CO_2$ product stream external from the primary recirculating flow. In some aspects, the second mass transfer column 40 may be configured to remove NO and/or $NO_2$ in the form of $HNO_3$ from the net $CO_2$ product stream before the high pressure recirculating fluid is introduced to a compressor element 18 of the power generation system, as shown in FIG. 1A. In another aspect, as illustrated in FIG. 1B, the second mass transfer column 40 may be configured to remove NO and/or $NO_2$ in the form of $HNO_3$ from the net $CO_2$ product stream after the high pressure recirculating fluid is introduced to a compressor element 18 of the power generation system. The necessary components for this mass transfer, including the $NO_x$ gas phase catalyst, are present in the process fluid stream 4 that enters the first mass transfer column 30 where the $SO_2$ is removed as $H_2SO_4$. According to some aspects, these components include $SO_2$, NO, $NO_2$, $O_2$, and $H_2O$.

According to one aspect, stream 4 enters the base of the first mass transfer column 30, which may be a multi-stage direct contact counter-current liquid/vapor contacting column and may include internal contacting means such as trays, structured packing, random dumped packing, and/or the like. The first mass transfer column 30 has a bottom outlet pipe 6 which feeds either a net liquid product stream 7 or a first circulating pump 31 via an inlet line 8. The first circulating pump discharge line 9 enters a first water cooled heat exchanger 22, which discharges a cooled liquid stream 10 to the top of the first mass transfer column 30.

In some aspects, the first mass transfer column 30 cools the inlet $CO_2$ rich stream 4 from an exemplary temperature of approximately 65° C. against the cooled, recirculating fluid flow stream 10 falling counter-currently through internal contacting media to approximately near the ambient temperature. In particular, the $CO_2$ is cooled to a minimum temperature that approaches the temperature of the cooling water. According to one exemplary aspect, the $CO_2$ is cooled to about 16° C., while the cooling water approaches a temperature of approximately 13° C. As the inlet $CO_2$ stream flows upward through the contacting media, the stream cools to near ambient temperature, water further condenses, and pollutant removal reactions occur. These pollutant removal reactions proceed first in the gas phase through the oxidation of NO to $NO_2$ using remaining excess $O_2$ in the inlet $CO_2$ rich stream 4. Subsequently, $SO_2$ is oxidized by $NO_2$ to form $SO_3$ and NO. Third, $SO_3$ reacts with water ($H_2O$) to form $H_2SO_4$ in the liquid phase, thereby removing $SO_2$. NO acts as a gas phase catalyst in this process. The pollutant removal reactions involved are detailed in the equations below:

$$NO + 1/2 O_2 = NO_2 \quad \text{Eq. G}$$

$$NO_2 = N_2O_4 \quad \text{Eq. H}$$

$$2NO_2 + H_2O = HNO_2 + HNO_3 \quad \text{Eq. I}$$

$$3HNO_2 = HNO_3 + 2NO + SO_3 \quad \text{Eq. J}$$

$$NO_2 + SO_2 = NO + SO_3 \quad \text{Eq. K}$$

$$SO_3 + H_2O = H_2SO_4 \quad \text{Eq. L}$$

These reactions are well understood as the mechanism of the Lead Chamber Process for sulfuric acid production. Additionally, the reactions can be described, as follows: Eq. G is gas phase, kinetically controlled; Eq. H is gas phase, equilibrium controlled with fast kinetics; Eq. I is liquid phase, kinetically controlled; Eq. J is liquid phase, equilibrium controlled with fast kinetics; Eq. K is gas phase, equilibrium controlled with fast kinetics; and Eq. L is dissolution in the aqueous phase which can be designed within a contactor to be a sufficiently fast process.

At the elevated pressure of approximately 29 bar in the presence of excess liquid water and a partial pressure of $O_2$ of approximately 0.58 bar and with about 100 to about 2000 ppm $SO_2$ and about 20 to about 2000 ppm $NO_x$ present in stream 4, these reactions proceed spontaneously and rapidly. Additionally, the system is controlled to ensure that the concentration of $SO_2$ in stream 11 exiting the top of the first mass transfer column 30 is below about 50 ppm while the concentration of $HNO_2$ and $HNO_3$ in the net product liquid stream 7 is below about 1%.

In one aspect, these concentrations are obtained by controlling the inlet concentration of $NO_x$ in stream 4 and/or by controlling the discharge flow 9 from the first circulating pump 31, which provides for the liquid to vapor ratio, and hence the separation efficiency in the first mass transfer column 30, to be adjusted. In another aspect, the concentration of $NO_x$ in the inlet $CO_2$ rich stream 4 can be adjusted while the discharge flow 9 from the first circulating pump 31 remains constant so as to ensure the concentration of $SO_2$ in stream 11 exiting the top of the first mass transfer column 30 and/or the concentration of $HNO_2$ and $HNO_3$ in the net product liquid stream 7 are suitable concentrations.

According to some aspects, as shown in FIG. 1A, the discharge $CO_2$ product stream 11 leaving the top of the first mass transfer column 30 may be divided. For example, as shown in FIG. 1A, the bulk of the $CO_2$ product stream 11 is diverted as the recycled, recirculating fluid stream 1A, which enters the compression and pumping elements 18 of the power generation system 19, while the net product stream 2A enters a second mass transfer column 40. According to another aspect, as shown in FIG. 1B, the entire discharge $CO_2$ product stream 11 leaving the top of the first mass transfer column 30 may be fed to the compression and pumping element 18 of the power generation system as the recycled, recirculating fluid stream 1B. After the recycled, recirculating fluid stream passes through at least one compression and/or pumping element 18 of the power generation system, the high pressure, recirculating working fluid 3 may be divided such that the net product stream 2B enters the second mass transfer column 40 after passing through at least one compression element 18 of the power generation system. The design of the second mass transfer column 40 provides for sufficient contacting time and separation efficiency for a sequence of reactions, which lead to the formation of nitric acid. The second mass transfer column 40 may include a bottom outlet liquid stream 12, which may be divided into a nitric acid product stream 13 and a nitric acid recycle stream 14. Said nitric acid streams understood to be aqueous streams with varying nitric acid content. In one aspect, the nitric acid, recycle stream 14 passes through a second circulating pump 41. The discharge flow 15 from the second circulating pump 41 is fed into a water and/or ambient air cooled heat exchanger 23, which produces a cooled inlet dilute nitric acid stream 16 to the second mass transfer column 40.

In some aspects, the second mass transfer column 40 includes a second contacting section above the inlet point of the cooled dilute nitric acid stream 16. The second contacting section disposed above the inlet point of the cooled dilute nitric acid stream 16 may be irrigated with a pure water inlet stream 24. In one aspect, the flow rate of the pure water inlet stream 24 may be adjusted to obtain the desired $HNO_3$ concentration in the nitric acid product stream 13. The flow rate may also function to effectively remove acid carry-over in the final $CO_2$ net product stream 17. The final $CO_2$ net product stream 17 will be substantially free of acid particulates and will have a low specified concentration of $SO_2$ and $NO_x$.

In one aspect, the set of mass transfer reactions may be accomplished by the first direct contact reactor mass transfer column 30 creating sufficient gas to liquid contact so as to allow $SO_3$ formed in the gas phase to be quickly and efficiently converted to $H_2SO_4$ in the liquid phase. The first mass transfer column 30 may be a column that includes structured and/or random packing and/or distillation trays with a counter-flow arrangement of gas and liquid. Additionally, the first mass transfer column 30 may include a bottom inlet for receiving the inlet $CO_2$ rich stream 4 and a top inlet for receiving the cooled recycle dilute acid stream 10. Such an arrangement for the first mass transfer column 30 may provide a closed loop cooling fluid, which recirculates through an indirect heat exchanger 22. In some aspects, heat removed in the first mass transfer column 30 may be transferred to an ambient temperature cooling means, such as a cooling water circulating system, which may include a cooling tower and/or a forced convection fan-air cooler.

Additionally, the first mass transfer column 30 may include an efficient demister disposed above the contacting section. The demister may be configured to remove entrained dilute $H_2SO_4$ from the discharge $CO_2$ product stream 11 so as to protect downstream compression equipment from corrosion; solutions containing $H_2SO_4$ have a tendency to form troublesome mists. Alternatively, an additional section of contacting media may be installed and irrigated with a pure water stream to dilute the acid particulate and/or remove carry-over of acid particulate. An additional section of contacting media may provide for optimization of gas to liquid contact, which may accelerate mass transfer reactions that produce sulfuric acid, may limit the need for an additional cooling medium, and may condense remaining combustion derived $H_2O$ from the recirculating stream following high-grade heat recovery from the exhaust stream via the recuperative heat exchanger in the power generation system. The optimization of gas to liquid contact, limiting the need for additional cooling medium, and/or condensing remaining combustion derived $H_2O$ desirably occur within a reasonable column size and residence time.

According to some aspects, conditions within the combustor of the power generation system 19 provides for a small production of NO by combining nitrogen, nitrogen-containing components in the fuel, and/or nitrogen derived from air ingress through system seals with excess oxygen at typical combustion temperatures of about 1500° C. to about 2500° C., typical combustion pressures of about 100 bar to about 500 bar, and excess $O_2$, which may have a composition ranging about 0 mol % to about 5 mol % $O_2$ following combustion and mixing with recycled high pressure $CO_2$. In one aspect, higher flame temperatures may be generally desired as the thermal NO formation mechanism may dominate the production of NO. The conservation of this quantity of NO is desirable as elevated concentrations of NO assist and accelerate the removal reactions of $SO_2$ to $H_2SO_4$ in the first mass transfer column 30 to proceed at sufficient rates. Conservation of NO produced from the combustor may be accomplished via design considerations such as, for example, by the accumulation of NO within a semi-closed loop system and/or by minimizing the conversion of gaseous $NO_2$ (formed by reaction of NO and $O_2$) to aqueous $HNO_3$. The accumulation of NO in a semi-closed loop system may be provided by the inherent design of the power generation system 18, 19, and the minimization of gaseous $NO_2$ to aqueous $HNO_3$ conversion may be accomplished by matching the column residence time of the first mass transfer column 30 to selectively remove $SO_2$, as described herein.

In one aspect, the NO concentration may be kept high via careful design of the direct contact means within the first mass transfer column 30 so as to have a residence time which minimizes the conversion of $NO_2$ to $HNO_2$ and/or $HNO_3$. In particular, it has been observed that while $SO_2$ exists in the cooled turbine exhaust, the $NO_2$, which is formed by the oxidation of NO with $O_2$, is immediately converted back to NO by reacting with $SO_2$. The immediate conversion of the $NO_2$ back to NO thereby preserves a high concentration of gas phase catalyst. In this regard, once a substantially high quantity of $SO_2$ has been permanently removed from the gas phase by conversion of $SO_2$ to $H_2SO_4$ in the liquid phase, a subsequent sequence of reactions occur in which $NO_2$ dissolves in water to form $HNO_2$ and $HNO_3$. Additionally, one desirable aspect provides for conditions in the first mass transfer column 30 to convert a lesser amount of NO to $HNO_2$ and/or $HNO_3$ by the second reaction sequence in the first mass transfer column 30. For example, conditions in the first mass transfer column 30 may provide for a $CO_2$ rich discharge stream 11 that exits the first mass transfer column where less than 30% by mass of the $NO_x$ is converted to $HNO_2$ and/or $HNO_3$. In some aspects, about less than 5% of the $NO_x$ is converted to $HNO_2$ and/or $HNO_3$ before the high pressure recirculating working fluid exits the first mass transfer column. Converting a greater amount of NO to $HNO_2$ and/or $HNO_3$ would reduce the concentration of NO in the inlet $CO_2$ rich stream 4 that exits the turbine of the power generation system 19 and enters the first mass transfer column 30, thereby lowering the conversion rate of $SO_2$ to $H_2SO_4$. Furthermore, any $HNO_2$ and/or $HNO_3$ converted leaves the first mass transfer column 30 in the sulfuric acid liquid stream 7 and can be subsequently neutralized. The actual amount of $NO_x$ conversion is tunable based on the exact process needs.

The isolated removal of $SO_2$ in the first mass transfer column 30 further may accumulate sulfuric acid (and/or trace $HNO_3$) in the recirculating fluid of the first mass transfer column 30. In one aspect, a small $HNO_3$ concentration in the sulfuric acid liquid stream may exist, but the concentration amount can be controlled to a minimum. Reaction of $HNO_3$ with mercury derived from the coal takes place primarily in the second mass transfer column 40 forming mercuric nitrate. The mixed $H_2SO_4+HNO_2+HNO_3$ may also convert other low concentration impurities to soluble salts, which may be removed in the liquid acid phase. Additionally or alternatively, the remaining sulfuric acid created within the first mass transfer column 30 can be reacted with a slurry of crushed limestone and/or any other suitable alkaline compound in water so as to convert $H_2SO_4$ to calcium sulfate. The converted calcium sulfate may be removed as a solid and used commercially and/or disposed of. Additionally, $CO_2$ may be released during this step, producing a pure product that can be combined with the net power cycle $CO_2$ stream 1 and/or diverted to a common or separate system venting stream 17 to a pipeline 21 for transport.

In some aspects, the NO produced inherently within the process may be insufficient to catalyze a sufficient removal of $SO_2$ from the process gas. According to one aspect, an NO addition stream 5 including substantially NO can be introduced to the power generation system 5. In some aspects, the NO may be produced, for example, by the oxidation of ammonia ($NH_3$) with a mixture including oxygen and/or carbon dioxide over a catalyst in a NO producing unit 20. Addition of pure $N_2$ to the power generation system 18, 19 may be undesirable because the addition may lead to drastic effects on system dynamics. For example, the addition of pure $N_2$ may change important working fluid properties, such as the compressibility of the fluid. By controlling the inlet concentration of NO to the first mass transfer column 30 via the addition of NO through the NO addition stream 5, the required removal time of $SO_2$ from the process gas can be controlled to fall within a desired column residence time. Central to this control mechanism is that NO may not be consumed until substantially all of the $SO_2$ is removed. As such, the first reactor mass transfer column 30 may be tuned and/or designed by careful control of the inlet NO concentration to remove nearly all of the $SO_2$ (e.g., 99.99%) without significant removal of NO. The specific NO concentration may be determined by the inlet $SO_2$ concentration as well as the designed residence time for $SO_2$ removal. For example, according to one aspect, the NO concentration at the inlet to the first mass transfer column 30 may be about 152 ppm and the $SO_2$ concentration at the inlet to the first mass transfer column 30 may be about 1318 ppm. According to some aspects, the reflux ratio in both the first mass transfer column 30 and/or the second mass transfer column 40 may be controlled by controlling the flow-rates in the first and/or second circulation pumps 31, 41. In some aspects, one design consideration of the power generation system may include the column residence time, which may be optimized such that when the $SO_2$ removal is complete and the gas phase is separated from the liquid phase, the conversion of NO to $HNO_2$ and/or $HNO_3$ may not occur.

In one exemplary power generation system 18, 19 that includes a recirculating process fluid, an amount of NO can be conserved within the process stream by tuning and/or configuring the column residence time and concentrations of species at the inlet of the first mass transfer column 30 so that a desired removal efficiency of $SO_2$ is achieved within the first mass transfer column 30 while permitting NO to remain in the discharge $CO_2$ product stream 11 at the outlet of the first mass transfer column 30. According to one exemplary aspect, the first column residence time is about 30 seconds and the NO concentration at the exit of the first column is about 155 ppm. In this regard, an accumulation effect occurs, which creates an elevated NO concentration within the recycling fluid stream 1, which thereby may reduce the quantity of NO addition required from the NO producing unit 20 for sustaining the same $SO_2$ removal rate in the first direct contact reactor mass transfer column 30. This accumulation effect has particular impact in systems where combustion results in elevated concentrations of $SO_2$ thereby allowing for the removal time to be substantially reduced by elevating the concentration of NO within the system.

In some aspects, following cooling and $SO_2$ removal in the first direct contact reactor mass transfer column 30 of the power generation system 5, the discharge $CO_2$ product stream 11 may be split into two streams and compressed to a pressure ranging from approximately 100 bar to approximately 500 bar. A minor stream dilutes an oxygen stream, forming the oxidant mixture used in the combustor, while a major stream is heated in the recuperative heat exchanger of the power generation system 19 to a temperature ranging from about 500° C. to about 800° C. and mixes with the combustor product gas forming the turbine inlet flow. Under these conditions virtually no destruction of NO occurs due to conversion of NO to $N_2$ and $O_2$ and/or the formation of NO by a reaction between $N_2$ and $O_2$. The amount and concentration of NO in the recuperated, cooled inlet $CO_2$ rich stream 4 entering the first mass transfer column 30 may be higher than the concentration and amount leaving the first mass transfer column 30 and entering the recycling fluid stream 1 as a small amount of $HNO_3$ is formed in the first mass transfer column 30 and the $NO_x$ present in the net $CO_2$ product stream 2 enters the second mass transfer column 40.

In addition, the design of the first and second mass transfer columns 30, 40 ideally will be such that the gas residence time will result in reasonable reaction conditions for the power generation system 18, 19 operating over a full operational range from a maximum output to a minimum turndown. For example, at a maximum turndown (e.g. 50% turbine flow), the column residence time is doubled, which may cause substantially more NO loss. However, the increased time for reactions may provide for a lower NO concentration in the inlet gas, which may still allow for the desired $SO_2$ removal. This NO concentration may be supplemented via addition and accumulation in manners discussed herein.

According to one exemplary aspect, the second mass transfer column 40 may be smaller than the first mass transfer column 30 and may be inserted in the net $CO_2$ product stream of the power generation system 18, 19. Additionally, the smaller, second mass transfer column 40 may employ similar reactions and/or design considerations as the first mass transfer column 30 such that the smaller second mass transfer column 40 is also configured to remove $SO_2$. The smaller, second direct contact reactor mass transfer column 40 may then subsequently alter the NO concentration to a desired downstream NO concentration, and may additionally or alternatively produce $HNO_2$ and $HNO_3$ during the process. The column may operate at a similar pressure to the first direct contact reactor, or at a substantially elevated pressure, following a compression step or series of compression steps. According to another aspect, the second mass transfer column 40 may operate at a similar temperature to that of the first mass transfer column 30 or at a substantially elevated temperature compared to the first mass transfer column, and may depend on the requirements for the final $CO_2$ net product stream 17.

The design of the first and second mass transfer columns 30, 40 may be influenced by the removal rate characteristics of $SO_2$ and NO. For example, $SO_2$ removal accelerates to an approximately 100% removal rate with increasing residence time, pressure, and NO concentration in the first mass transfer column 30. Thus, high inlet NO concentration may be desired to increase the $SO_2$ removal rate. For example, FIG. 2 illustrates a graph showing that given a fixed residence time, the removal time for removing $SO_2$ in the first mass transfer column 30 decreases as the NO concentration increases. FIG. 3 illustrates that the NO removal time with respect to a desired outlet concentration limit asymptotically approaches a fixed required removal time once $SO_2$ has been substantially removed. This indicates that even at high levels of accumulation of NO, the additional time required for NO removal to a desired limit at the second mass transfer column 40 eventually approaches an asymptotic time, while the removal time of $SO_2$ in the first mass transfer column 30 invariably decreases with the addition of excess NO. This implies that an addition of NO to increase the removal rate of $SO_2$ in first mass transfer column 30 can be sustained in the second mass transfer column 40, which can be tuned and/or designed to the asymptotic removal time plus a relevant safety factor. In some aspects, the removal of $NO_x$ in the second contactor may be further accelerated by the addition of additional oxygen to the column.

In other aspects the removal of $NO_x$ in the second column 40 may be accelerated by compression of stream 2A and/or 2B to a pressure above that of the first column 30 before entering the second column. This will accelerate the conversion of NO to $NO_2$ as shown in Eq. G such that the removal reactions are driven more quickly to completion. The exact discharge pressure of this compressor may be adjusted to as to enact the required removal in the second column 40. Such embodiments are illustrated in FIG. 1A wherein compressor 62 is present in line 2A between Block 18 and the second column 40. The compressor can be optional. Alternatively, in relation to FIG. 1B, the entire content of the recycle stream containing $CO_2$ and $NO_x$ can be input to the power production system in Block 18 where it can undergo compression. Accordingly, stream 2B may be taken directly from Block 18 at any pressure to be delivered to the second column 40.

In some embodiments, it can be desirable to add additional oxygen to the stream prior to entry into the second column 40. As illustrated in FIG. 1B, an oxygen source 60 is positioned to supply oxygen via line 61a to the stream 2B prior to entry into the second column 40. It is understood that such elements for adding oxygen likewise may be applicable to the addition of oxygen to line 2A in FIG. 1A. The oxygen source can be optional. In other aspects an addition of excess oxygen and a series of recompression can be enacted in order to further accelerate removal of NOx.

Aspects of the present disclosure are more fully illustrated by the following example(s), which are set forth to illustrate certain aspects of the present disclosure and are not to be construed as limiting thereof.

Example 1

An evaluation was performed in relation to a power generation system that utilizes the oxy-combustion of a carbonaceous fuel to power a fully recuperated, trans-critical carbon dioxide Brayton power cycle. This arrangement, in various aspects, inherently captures $CO_2$ at a sequestration and/or pipeline ready pressure. In aspects where the concentrations of sulfur and nitrogen are low in the combustion fuel, $CO_2$ can be captured using minimal post-treatment steps. Thus, the $CO_2$ released from the cycle can be vented to a $CO_2$ pipeline at the desired molar purities with little to no additional post-treatment. However, when the fuel contains elevated concentrations of sulfur and nitrogen, and/or when air ingress to the system is relatively high, combustion temperatures and high temperatures at the hot end of the plant oxidizes the fuel as well as any other oxidize-able compounds and may produce acid gases such as $NO_x$ and/or $SO_x$ that must be removed to protect both process equipment and to satisfy mandated $CO_2$ pipeline purity levels.

In one example, a system 50 is configured, in a manner as described herein, with a first and second mass transfer column. The first mass transfer column is incorporated into the recycling fluid stream, and treats and selectively removes $SO_2$ from the recycling fluid. At the entrance of the first mass transfer column, NO is injected into the recycling fluid stream via any suitable process at a steady flow rate, and is adjusted so as to control the complete removal of $SO_2$ within the first mass transfer column given the residence time provided. In one exemplary embodiment, the NO injection rate is about 46.67 lb/hr and utilizes ammonia oxidation over a catalyst. Within the first mass transfer column, at a pressure of approximately 30 bar and at a temperature of about 60° F. to about 200° F., $SO_2$ is removed and the majority of NO is allowed to exit with the working fluid and thus recirculate within the process thereby resulting in an elevated system-wide concentration of NO. This elevated concentration of NO has the implication of accelerating $SO_2$ removal within the first mass transfer column.

The second mass transfer column operates at the outlet of the power generation system at a pressure of approximately 30 bar and at approximately an ambient temperature. In particular, the second mass transfer column removes residual NO in the working fluid to a desired concentration, such as approximately 20 ppm. Computer simulations of the example system have been completed, and the results and relevant inputs such as the residence time and inlet and outlet concentrations of NO and $SO_2$ are shown in Table 1 below. The results and relevant inputs shown in Table 1 below are intended for to be exemplary in purpose and are not intended to limit the scope of the present disclosure. Results disclosed herein are not intended to be interpreted as concrete expectations, but merely indications of an approximated result (i.e., the amount of $SO_x$ (molfrac) leaving the second mass transfer column, 1.39E-20, indicates that there is substantially zero amount of $SO_x$ leaving the second mass transfer column).

TABLE 1

Properties of First and Second Direct Contact Reactor Mass Transfer Columns in a Power Generation System

| | | | |
|---|---|---|---|
| First direct contact reactor mass transfer column | sec | Required Residence Time | 30 |
| Second direct contact reactor mass transfer column | sec | Required Residence Time | 22.2 |
| $NO_x$ Addition | lbmol_NO/hr | Injected NO | 1.5553 |
| | lb_NO/hr | Injected NO | 46.6685495 |
| First direct contact reactor mass transfer column | lb/hr | Total NO at Inlet | 780.744945 |
| | | Total $SO_2$ at Inlet | 14458.5508 |
| | | Outlet NO | 780.474244 |
| | | Outlet $SO_2$ | 0.000263097 |
| | Mol fraction | NO In | 0.000151911 |
| | | $SO_2$ In | 0.00131764 |
| | | $NO_x$ Out | 0.000155385 |
| | | $SO_x$ Out | 2.45E-11 |
| | lb/hr | Total Mass Flow Out | 7335076.8 |
| Second direct contact reactor mass transfer column | lb/hr | Inlet $NO_x$ | 44.1640181 |
| | | Inlet $SO_x$ | 1.49E-05 |
| | | Outlet $NO_x$ | 8.44E-15 |
| | | Outlet $SO_x$ | 5.6701554 |
| | Mol fraction | $NO_x$ In | 0.000155632 |
| | | $SO_x$ In | 2.46E-11 |

TABLE 1-continued

Properties of First and Second Direct Contact Reactor Mass Transfer Columns in a Power Generation System

| | | | |
|---|---|---|---|
| | | $NO_x$ Out | 2.00E-05 |
| | | $SO_x$ Out | 1.39E-20 |
| | lb/hr | Total Mass Flow Out | 413664.494 |

Although increasing the injection rate of NO into the recirculating process gas stream would decrease the required residence time in the first direct contact reactor mass transfer column for total $SO_2$ removal, a balance between the variable cost of pumping duty, NO addition, neutralization, and the capital cost of column size exists, which will ultimately determine the residence time required for optimum $SO_2$ removal speed and costs.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for removing an acid gas from a power cycle product stream, the method comprising:
   carrying out a power production cycle;
   directing a product stream containing $CO_2$, $SO_x$, and $NO_x$ from the power production cycle into a first direct contact cooling tower;
   contacting the product stream containing $CO_2$, $SO_x$, and $NO_x$ in the first direct contact cooling tower with a first counter-current circulating aqueous liquid stream;
   removing at least a portion of $SO_2$ present in the product stream in the first direct contact cooling tower via reaction between the $SO_2$ and $NO_2$ in the product stream in the presence of the aqueous liquid stream;
   withdrawing from the first direct contact cooling tower a recycle stream containing $CO_2$ and $NO_x$; and
   delivering at least a portion of the recycle stream containing $CO_2$ and $NO_x$ back into the power production cycle.

2. The method according to claim 1, wherein the first counter-current circulating aqueous liquid stream comprises $H_2SO_4$.

3. The method according to claim 1, wherein the product stream containing $CO_2$, $SO_x$, and $NO_x$ contains at least 10 ppm $NO_x$ based on the total mass of the product stream containing $CO_2$, $SO_x$, and $NO_x$.

4. The method according to claim 1, wherein the NOx concentration in the product stream containing $CO_2$, $SO_x$, and $NO_x$ is controlled within a range such that less than 50% by mass of the $NO_x$ in the product stream containing $CO_2$, $SO_x$, and $NO_x$ is converted to $HNO_3$ in the first direct contact cooling tower.

5. The method according to claim 1, wherein the recycle stream containing $CO_2$ and $NO_x$ that is withdrawn from the first direct contact cooling tower includes at least 90% by mass of the NOx present in the product stream containing $CO_2$, $SO_x$, and $NO_x$ that is introduced into the first direct contact cooling tower.

6. The method according to claim 1, wherein the recycle stream containing $CO_2$ and $NO_x$ that is withdrawn from the first direct contact cooling tower includes substantially no $SO_2$ or contains $SO_2$ in an amount of less than 50 ppm based on the total mass of the recycle stream containing $CO_2$ and $NO_x$.

7. The method according to claim 1, wherein the concentration of $NO_x$ in the product stream containing $CO_2$, $SO_x$, and $NO_x$ is adjusted by adding NOx upstream from the first direct contact cooling tower.

8. The method according to claim 7, wherein $NO_x$ is added upstream from the first direct contact cooling tower by combining a nitrogen source with a fuel and an oxidant in a combustor upstream from the first direct contact cooling tower.

9. The method according to claim 7, wherein $NO_x$ is added directly to the product stream containing $CO_2$, $SO_x$, and $NO_x$ upstream from the first direct contact cooling tower.

10. The method according to claim 9, wherein the $NO_x$ that is added directly to the product stream containing $CO_2$, $SO_x$, and $NO_x$ upstream from the first direct contact cooling tower is generated from ammonia.

11. The method according to claim 1, wherein the concentration of $NO_x$ in the product stream containing $CO_2$, $SO_x$, and $NO_x$ is adjusted by increasing or decreasing a discharge flow from a first recirculating pump that is configured to receive a liquid product stream from the first direct contact cooling tower and recirculate the liquid product stream into the first direct contact cooling tower.

12. The method according to claim 1, wherein at least a portion of the $NO_x$ in the recycle stream containing $CO_2$ and $NO_x$ is directed back into the power production cycle.

13. The method according to claim 1, wherein the recycle stream containing $CO_2$ and $NO_x$ is divided into a recirculating working fluid stream that is directed back into the power production cycle and a net $CO_2$ product stream.

14. The method according to claim 1, further comprising:
directing at least a portion of the recycle stream containing $CO_2$ and $NO_x$ into a second direct contact cooling tower;
contacting the recycle stream containing $CO_2$ and $NO_x$ in the second direct contact cooling tower with a second counter-current circulating aqueous liquid stream;
removing at least a portion of $NO_2$ from the recycle stream containing $CO_2$ and $NO_x$ in the second direct contact cooling tower via reaction between the $NO_2$ and water; and
withdrawing from the second direct contacting cooling tower a stream containing $CO_2$.

15. The method according to claim 14, wherein the second counter-current circulating aqueous liquid stream comprises $HNO_3$.

16. The method according to claim 14, further comprising adding $O_2$ to the recycle stream containing $CO_2$ and $NO_x$ prior to directing the recycle stream containing $CO_2$ and $NO_x$ into the second direct contact cooling tower.

17. The method according to claim 14, wherein prior to directing at least a portion of the recycle stream containing $CO_2$ and $NO_x$ into the second direct contact cooling tower, the recycle stream containing $CO_2$ and $NO_x$ is compressed utilizing a compressor in the power production cycle.

18. The method according to claim 14, wherein the recycle stream containing $CO_2$ and $NO_x$ is divided into a recirculating portion that is directed back into the power production cycle and a net production portion that is directed to the second direct contact cooling tower.

19. A system for removing an acid gas from a power cycle product stream, the system comprising:
a transfer element configured to deliver a power cycle product stream containing $CO_2$, $SO_x$, and $NO_x$ from a component of a power cycle;
a first direct contact cooling tower configured to receive the power cycle product stream containing $CO_2$, $SO_x$, and $NO_x$ from the component of the power cycle under reaction conditions such that at least a portion of $SO_2$ is removed therefrom and a recycle stream containing $CO_2$ and $NO_x$ is output from the first direct contact cooling tower;
a first recirculating pump in fluid communication with the first direct contact cooling tower configured to receive a liquid stream from the first direct contact cooling tower and recirculate at least a portion of the liquid stream to the first direct contact cooling tower; and
a transfer element configured to deliver at least a portion of the recycle stream containing $CO_2$ and $NO_x$ to a component of the power cycle.

20. The system according to claim 19, further comprising:
a second direct contact cooling tower configured to receive at least a portion of the recycle stream containing $CO_2$ and $NO_x$ from the first direct contact cooling tower under reaction conditions such that at least a portion of $NO_2$ in the recycle stream containing $CO_2$ and $NO_x$ is removed therefrom and a stream containing $CO_2$ is output from the second direct contact cooling tower; and
a second recirculating pump in fluid communication with the second direct contact cooling tower configured to receive a liquid stream from the second direct contact cooling tower and recirculate at least a portion of the liquid stream to the second direct contact cooling tower.

21. The system according to claim 19, further comprising an $O_2$ input positioned upstream from the second direct contact cooling tower and downstream from the first direct contact cooling tower.

22. The system according to claim 19, further comprising a compressor positioned upstream from the second direct contact cooling tower and downstream from the first direct contact cooling tower.

* * * * *